United States Patent
Li et al.

(10) Patent No.: US 9,595,889 B2
(45) Date of Patent: Mar. 14, 2017

(54) SYSTEM AND METHOD FOR SINGLE-PHASE AND THREE-PHASE CURRENT DETERMINATION IN POWER CONVERTERS AND INVERTERS

(71) Applicant: Eaton Corporation, Cleveland, OH (US)

(72) Inventors: Huaqiang Li, Menomonee Falls, WI (US); Yakov Lvovich Familiant, Brown Deer, WI (US); Xiaoling Li, Shenzhen (CN)

(73) Assignee: Eaton Corporation, Cleveland, OH (US)

( * ) Notice: Subject to any disclaimer, the term of this patent is extended or adjusted under 35 U.S.C. 154(b) by 241 days.

(21) Appl. No.: 13/768,418

(22) Filed: Feb. 15, 2013

(65) Prior Publication Data

US 2014/0233278 A1   Aug. 21, 2014

(51) Int. Cl.
*H02M 7/5387* (2007.01)
*H02M 5/458* (2006.01)
*H02M 1/00* (2006.01)

(52) U.S. Cl.
CPC ....... *H02M 7/53873* (2013.01); *H02M 5/458* (2013.01); *H02M 2001/0009* (2013.01)

(58) Field of Classification Search
CPC ..... H02M 7/53873; H02M 2001/0009; H02M 5/458

(Continued)

(56) References Cited

U.S. PATENT DOCUMENTS 3,286,138 A * 11/1966 Shockley ................ H01L 27/00
                                                    257/469
4,772,996 A *  9/1988 Hanei ................ H02M 7/53873
                                                    318/811

(Continued)

FOREIGN PATENT DOCUMENTS

| KR | 2009-0063397 A | 6/2009 |
| WO | 9107797 A1 | 5/1991 |
| WO | 0077933 A1 | 12/2000 |

OTHER PUBLICATIONS

Technical Catalogue, ABB Current and Voltage Sensors, Elektronische Strom Spannungswandler, May 2006.

(Continued)

*Primary Examiner* — Timothy J Dole
*Assistant Examiner* — Sisay G Tiku
(74) *Attorney, Agent, or Firm* — Ziolkowski Patent Solutions Group, SC

(57) ABSTRACT

A system and method for capturing current information for a power converter is disclosed. The current monitoring system includes a control system operably connected to a circuit having a plurality of semiconductor switches that are controllable to convert an input power to an output power having a desired voltage and current. The control system includes a PWM signal generator to generate switching signals that control switching of the switches, gate drivers to facilitate switching of the switches, and desaturation circuits to provide overcurrent protection to the switches. The control system further includes a processor that receives voltage data from the desaturation circuits regarding a measured voltage across each of the switches, determines a current through each of the switches based on the voltage across each respective switch, and calculates an input current to the (Continued)

circuit or an output current of the circuit based on the determined currents through the switches.

21 Claims, 11 Drawing Sheets

(58) Field of Classification Search
USPC ... 363/34, 37, 41, 78, 94, 89, 95, 97, 98, 56
See application file for complete search history.

(56) References Cited

U.S. PATENT DOCUMENTS

| | | | | |
|---|---|---|---|---|
| 5,687,049 | A * | 11/1997 | Mangtani | H02M 1/32 361/18 |
| 6,097,582 | A * | 8/2000 | John | H03K 17/0828 361/79 |
| 6,335,605 | B1 * | 1/2002 | Negoro | 318/727 |
| 6,335,608 | B1 * | 1/2002 | Takahashi | H02H 9/001 318/434 |
| 7,724,065 | B2 | 5/2010 | Bayerer et al. | |
| 7,768,337 | B2 | 8/2010 | Bayerer | |
| 7,851,866 | B2 | 12/2010 | Sakurai et al. | |
| 8,872,455 | B2 * | 10/2014 | Tremel | H02M 7/53871 318/400.22 |
| 9,002,265 | B2 * | 4/2015 | Wagoner | H03K 17/689 455/39 |
| 2005/0253165 | A1 * | 11/2005 | Pace | H02M 7/538 257/139 |
| 2007/0236187 | A1 * | 10/2007 | Wai | H02J 3/383 323/222 |
| 2007/0296363 | A1 | 12/2007 | Andrejak et al. | |
| 2008/0129238 | A1 * | 6/2008 | Andersen | H02H 7/1227 318/565 |
| 2011/0270545 | A1 * | 11/2011 | Doktar | G01R 31/025 702/58 |
| 2012/0217937 | A1 | 8/2012 | Miyauchi et al. | |

OTHER PUBLICATIONS

Description and Application Manual for 1SD418FI Scale High Voltage IGBT Drivers, CT-Concept Technology, Ltd., Intelligent Power Electronics, Switzerland, Sep. 10, 2002.
PCT International Search Report and Written Opinion from corresponding PCT/US2014/016175, Nov. 12, 2014.

* cited by examiner

SYSTEM AND METHOD FOR SINGLE-PHASE AND THREE-PHASE CURRENT DETERMINATION IN POWER CONVERTERS AND INVERTERS

BACKGROUND OF THE INVENTION

The present invention relates generally to electronic power converters and, more particularly, to a system and method for determining a single-phase and/or three-phase current in power converters, either input current to the converter or output current from the converter, as particularly suited for use with variable speed drives.

Power converters are electrical or electro-mechanical devices for converting electrical energy. Power converters can thus take the form of AC-AC converters that convert one AC waveform to another AC waveform with a desired voltage and frequency, or take the form of DC-AC inverters that invert DC power to an AC power having a desired voltage and frequency. Power converters can be implemented in single-phase or three-phase systems, for example, to provide such a desired power conversion.

One type of system commonly used in industry that performs power conversion is an adjustable or variable speed drive (VSD), which is an industrial control device that provides for variable frequency, variable voltage operation of a driven system, such as an AC induction motor. In many existing VSDs, Hall-effect current sensors, CTs and shunts are used for performing measurements of the three-phase output current of the VSD. However, such current measurement devices are expensive, sensitive to environmental conditions, and occupy a large amount of system "real estate" or space. Thus, even though Hall-effect current sensors, CTs and shunts provide accurate output current measurement, they impose certain drawbacks and limitations that are undesirable.

It would therefore be desirable to provide a system and method that provides for accurate determination of an output current from a VSD or other power converter/inverter, without requiring the use of high-cost, environmentally sensitive, space consuming current sensors. It would further be desirable to provide a system and method that provides for accurate determination of an input current to a VSD or other power converter/inverter.

BRIEF DESCRIPTION OF THE INVENTION

The present invention provides a system and method for determining single-phase and three-phase input and/or output current in electronic power converters. A controller operationally connected to the power converter includes gate drivers that provide gating signals to the semiconductor switches in the power converter, with the gate drivers having desaturation protection circuits that provide overcurrent protection. By employing the capabilities of the desaturation protection circuits, the saturation characteristics of the semiconductor devices in the power coverter are utilized in order to determine the input or output current of the power converter.

In accordance with one aspect of the invention, a current monitoring system for capturing current information for a power converter includes a circuit having a plurality of semiconductor switches being controllable to convert an input power from a source to an output power having a desired voltage and current. The current monitoring system also includes a control system operably connected to the circuit, with the control system comprising a PWM signal generator configured to generate switching signals to control switching of the plurality of semiconductor switches, a gate driver corresponding to each of the plurality of semiconductor switches that is configured to receive the switching signals from the PWM signal generator and produce an amplified high-current drive signal for input to a respective semiconductor switch so as to facilitate efficient switching thereof, and a desaturation circuit connected to each gate driver to provide overcurrent protection to a respective semiconductor switch, with the desaturation circuit configured to measure a voltage across its respective semiconductor switch. The control system further includes a processor programmed to receive voltage data from the desaturation circuits regarding a measured voltage across each of the plurality of semiconductor switches, determine a current through each of the plurality of semiconductor switches based on the voltage across each respective semiconductor switch, and calculate an input current to the circuit or an output current of the circuit based on the determined currents through the plurality of semiconductor switches.

In accordance with another aspect of the invention, a method for capturing current information for a power converter includes operably connecting a gate driver desaturation circuit to each of a plurality of semiconductor switches in a power converter, with the power converter configured to convert an input power having one or more phases to an output power having one or more output phases. The method also includes measuring a voltage across each of the plurality of semiconductors by way of the gate driver desaturation circuit, determining a current flowing through of each of the plurality of semiconductor switches based on the voltage across each respective semiconductor switch, and calculating a current input of each of the one or more phases of input power or a current output on each of the one or more output phases of the power converter based on the determined currents flowing through the plurality of semiconductor switches.

In accordance with yet another aspect of the invention, a current detection system includes a power converter having a plurality of transistors being controllable to convert an input power from a source to an output power having one or more output phases, with each of the plurality of transistors comprising an emitter terminal, a collector terminal, and a gate terminal. The current detection system also includes a control system operably connected to the power converter, with the control system further comprising a PWM signal generator configured to generate switching signals to control switching of the plurality of transistors, a gate driver corresponding to each of the plurality of transistors and configured to receive the switching signals from the PWM signal generator and produce an amplified high-current drive signal for input to a respective transistor so as to facilitate efficient switching thereof, and a desaturation circuit connected to each gate driver to provide overcurrent protection to a respective transistor, the desaturation circuit configured to measure a voltage across its respective transistor. The control system also includes a processor being programmed to receive voltage data from the desaturation circuits regarding a measured collector-emitter voltage drop across each of the plurality of transistors, select a current-voltage relational curve for each of the plurality of transistors that defines a relationship between a collector-emitter voltage drop across a respective transistor and a corresponding collector current, determine a collector current of each of the plurality of transistors based on a current-voltage relational curve for the respective transistor, and calculate one of a current input to the power converter or a current output from the power converter based on the determined collector currents of the plurality of transistors.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIG. 8 is a schematic view of a single-phase solar inverter to which embodiments of the invention can be applied to.

FIG. 9 is a schematic view of a two-level converter to which embodiments of the invention can be applied to.

FIG. 10 is a schematic view of a three-level T-type converter to which embodiments of the invention can be applied to.

FIG. 11 is a schematic view of a NPC three-level converter to which embodiments of the invention can be applied to.

DETAILED DESCRIPTION OF THE PREFERRED EMBODIMENTS

The embodiments of the invention set forth herein relate to electronic power converters and inverters and to a system and method that provides for capturing current information or data for a power converter. Single-phase and/or three-phase current in such power converters can be determined, with an input current to the power converter or an output current from the power converter being determinable.

Figure 1:
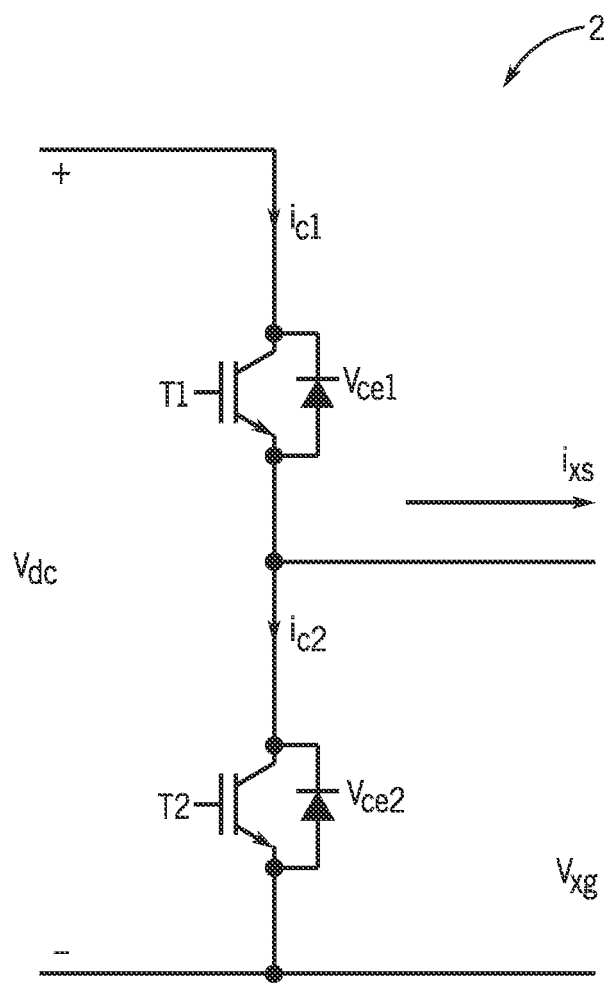
FIG. 1 is a circuit diagram of a known half-bridge circuit topology of a fundamental building block for a power converter.

Referring to FIG. 1, a known half-bridge circuit topology of a fundamental building block for a power converter is illustrated. The half-bridge circuit 2 includes a pair of switches T1, T2 that may be controlled to provide a desired power conversion. In one example, the half-bridge circuit may be controlled according to a pulse-width modulation (PWM) scheme to convert DC voltage ($V_{dc}$) to an AC waveform on the voltage output ($V_{out}$) to control an AC load, such as an AC motor for example. In another example, the half-bridge circuit 2 may be used for one phase of a single- or multi-phase DC-to-DC converter.

Figure 2:
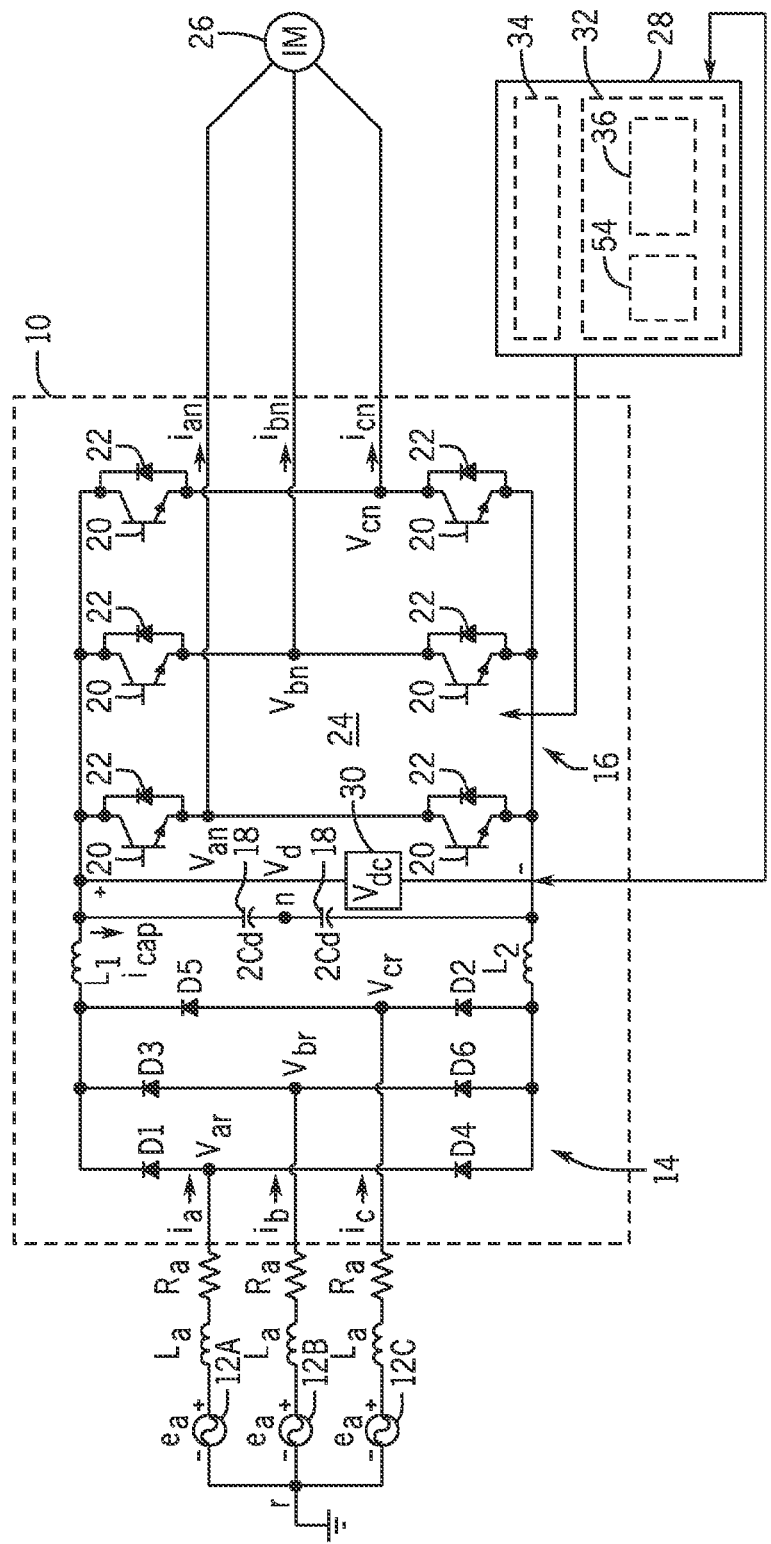
FIG. 2 is a schematic view of a 3-phase AC control system incorporating a power conversion device, such as a variable speed drive (VSD) including a rectifier and inverter, for controlling voltage to a load in a controlled fashion, according to an embodiment of the invention.

Power converters having various topologies can incorporate half-bridge circuit(s) 2 such as are shown in FIG. 1, and it is recognized that embodiments of the present invention may be incorporated into, and utilized with, any of a number of power converter topologies. However, for purposes of better illustrating aspects of the present invention, reference is made to a variable speed drive (VSD) 10 as illustrated in FIG. 2 that performs a power conversion by being designed to receive a three AC power input, rectify the AC input, and perform a DC/AC conversion of the rectified segment into a three-phase alternating voltage of variable frequency and amplitude that is supplied to a load. A three-phase AC input 12a-12c is fed to a three-phase rectifier bridge 14, with the input line impedances being equal in all three phases. The rectifier bridge 14 converts the AC power input to a DC power such that a DC link voltage is present between the rectifier bridge 14 and a switch array circuit 16. The link voltage is smoothed by a DC link capacitor bank 18. According to an exemplary embodiment, the switch array circuit 16 is comprised of a series of insulated gate bipolar transistor switches 20 (IGBTs) and anti-parallel diodes 22, such as an arrangement of six IGBTs 20 and diodes 22, that collectively form a PWM inverter 24 that synthesizes AC voltage waveforms with a fixed frequency and amplitude for delivery to a load, such as an induction motor 26. While the switch array circuit 16 is shown as including IGBTs 20, it is recognized that other embodiments of the invention contemplate other power switching devices as known in the art, such as MOSFETs, for example.

Operation of the inverter 24 is via a control system 28 that performs high speed operations such as space-vector modulation, DC link voltage decoupling, and protection, for example. The control system 28 interfaces to the PWM inverter 24 via gate drive signals and sensing of the DC link voltage and pole currents (by way a voltage sensor 30 for example) such that changes in DC link voltage can be sensed. These voltage changes can be interpreted as transient load conditions and are used to control switching of the switch array circuit 16 of PWM inverter 24 such that near steady-state load conditions are maintained. For interfacing the control system 28 to the PWM inverter via the gate drive signals, gate drivers (identified collectively as 32) are installed on each phase power structure in the VSD 10. Each of the gate drivers 32 receives low-power input signals from a PWM signal generator 34 in the control system 28 and produces an amplified high-current drive input for the gate of its corresponding IGBT 20, so as to facilitate efficient switching thereof.

In addition to amplifying signals received from a PWM signal generator 34, the gate drivers 32 further function as protection mechanisms by incorporating desaturation control circuits (identified collectively as 36) therein. The principle of operation of the desaturation control circuits 36 functioning as protection mechanisms is based on the fact that voltage across a power electronics switch (e.g., IGBT switches 20) is a function of current flowing through the switch. If the switch current exceeds its maximum allowed value, the voltage across the switch will pass a threshold voltage that corresponds to its maximum allowed current. Here the switching state should be taken into account—in the "Off" state (i.e., gate signal is 0), the voltage across the switch is equal to the DC link voltage even if a current through the switch is zero.

Figure 3:
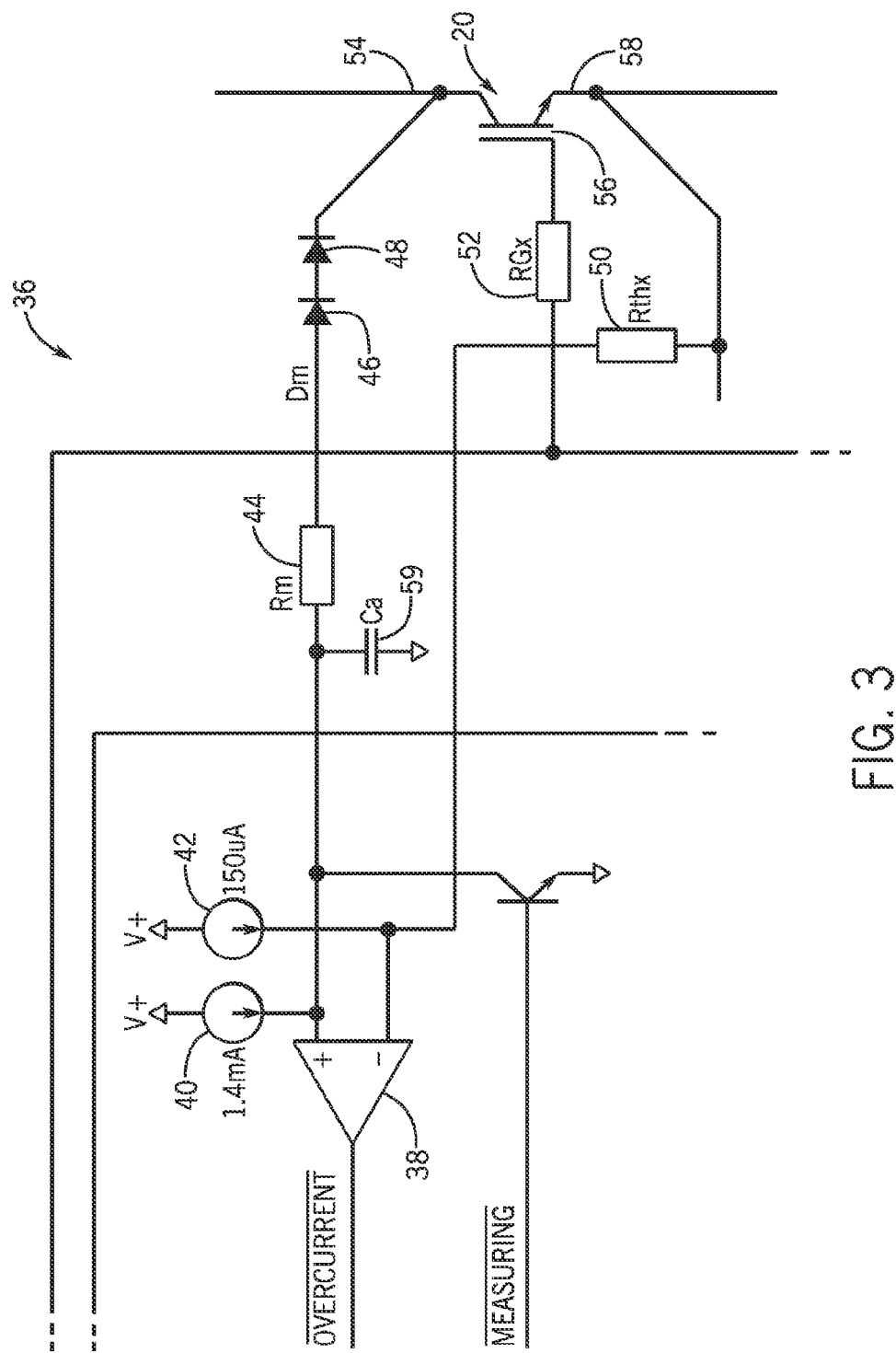
FIG. 3 is a schematic view of a gate driver desaturation circuit that can be incorporated in the system of FIG. 2, according to an embodiment of the invention.

A desaturation circuit, such as desaturation control circuit 36 incorporated into gate drivers 32, is illustrated in more detail in FIG. 3. The desaturation circuit 36 includes a comparator 38, two current sources 40, 42 (e.g., 1.4 mA and 150 uA current sources, for example), a resistor 44, $R_m$, in series with blocking diode(s) 46, 48, $D_m$, a reference resistor 50, $R_{thx}$, and a resistor 52, $R_{Gx}$. The desaturation circuit 36 is connected to a collector terminal 54, gate terminal 56, and emitter terminal 58, of the semiconductor switch 20. When semiconductor switch 20 is ON, positive input of the comparator 38 will be exposed to a voltage level that is equal to the collector-emitter voltage $V_{ce}$ minus a voltage drop across the resistor 44, $R_m$, and the blocking diode(s) 46, 48, $D_m$. This voltage value is compared with a voltage threshold $V_{th}$ that is equal to a magnitude of the current source times the resistance value of the reference resistor 50, $R_{thx}$ (i.e., $V_{th}$=150 uA*$R_{thx}$). During the On transition, if after some fixed delay (determined by resistor 44, $R_m$, and a capacitor 59, $C_a$) the collector-emitter voltage $V_{ce}$ did not fall below the voltage threshold $V_{th}$, the desaturation circuit returns a fault state signal—thus providing a mechanism for overcurrents and/or short circuits.

According to an embodiment of the invention, the desaturation circuit 36 can also be utilized to determine the output current from a power converter, such as the three-phase output current from the VSD 10 in FIG. 2. That is, the relationships between the semiconductor (IGBT, MOSFET) voltage drop and current flowing through the semiconductor is utilized to determine the output current, without the need to install any additional current sensors, such as current transducers, hall-effect current sensors, CTs and shunts. The temperature effect, semiconductor properties, gate drive voltage regulation, DSPs (digital signal processors) or MCUs (microprocessors) are taken into account in its implementation. While the following description of determining the output current from a power converter is set forth with respect to utilizing the desaturation circuit 36 of FIG. 3, it is recognized that embodiments of the invention can make use of other similar circuits to determine the output current of a power converter. Thus, embodiments of the invention are not limited for use only with desaturation circuit 36, but the utilizing of other comparable circuits in determining the output current of a power converter is also considered to be within the scope of the invention.

Figure 4:
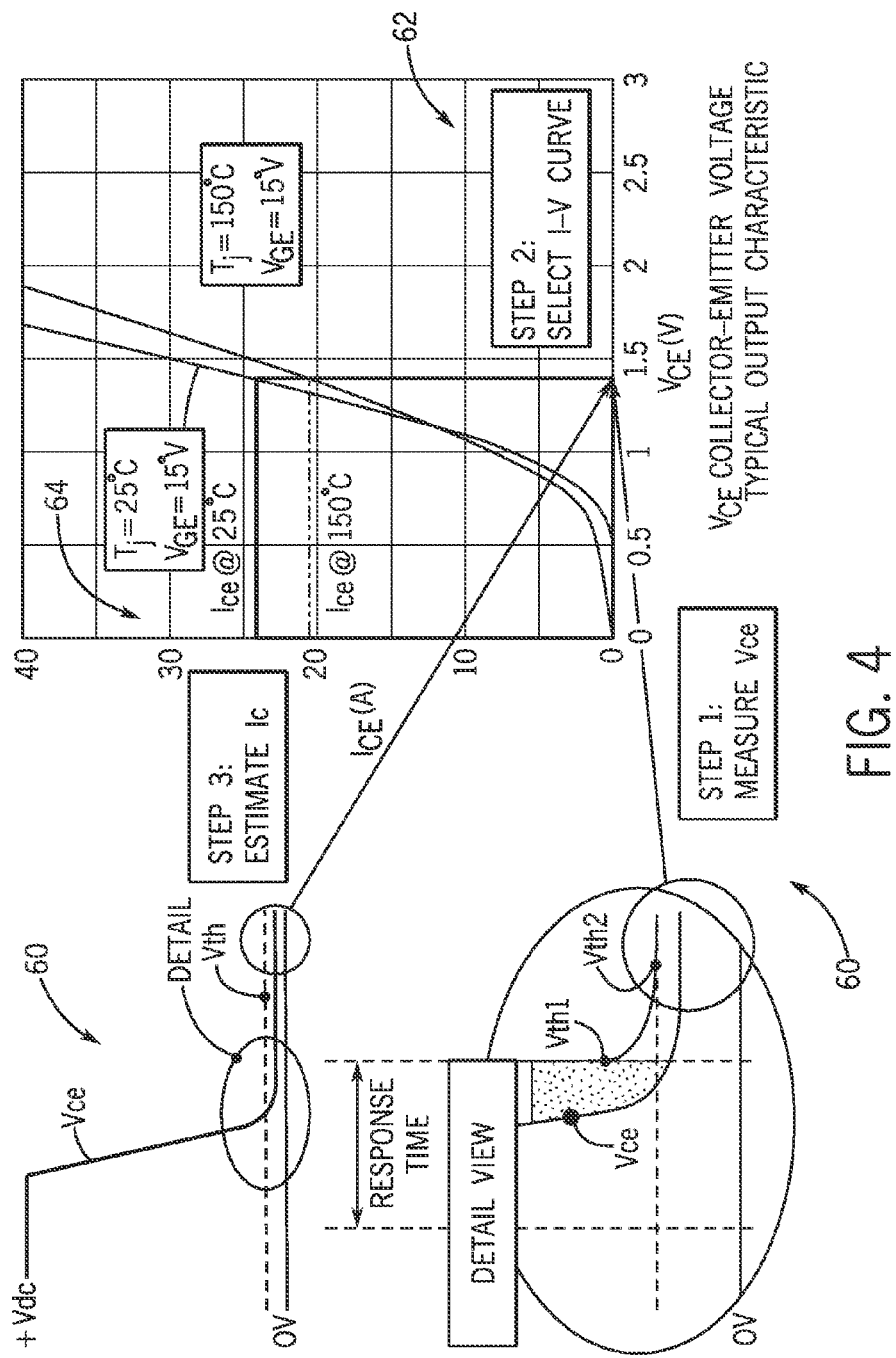
FIG. 4 is a diagram illustrating a technique for determining an input or output current in a power converter, according to an embodiment of the invention.

In determining the output current from a power converter, such as from inverter 24 in the VSD 10 in FIG. 2, the collector-emitter voltage $V_{ce}$ is not compared with the voltage threshold $V_{th}$, but is instead processed by a processor (e.g., see digital signal processor (DSP) 54 in FIG. 2) to estimate a transistor current that created this voltage drop, such as by utilizing a look-up table or employing an analytical function. According to one embodiment of the invention, and as illustrated in FIG. 4, in determining the output current from a power converter, a voltage across each semiconductor device 20 (i.e., the collector-emitter voltage $V_{ce}$) is first measured, as indicated generally at 60. Based on the measured voltage, a corresponding current and voltage relational curve is selected for each semiconductor device 20, as indicated generally at 62, with the collector current $I_c$ at each semiconductor device then being determined based on the voltage-current relationship defined by its respective selected current-voltage curve, as indicated generally at 64. When the collector current $I_c$ for each of the semiconductor devices is determined, such as for each of the six IGBTs 20 in the three-phase two-level inverter configuration shown in FIG. 2, then the load current can be calculated.

Figure 5:
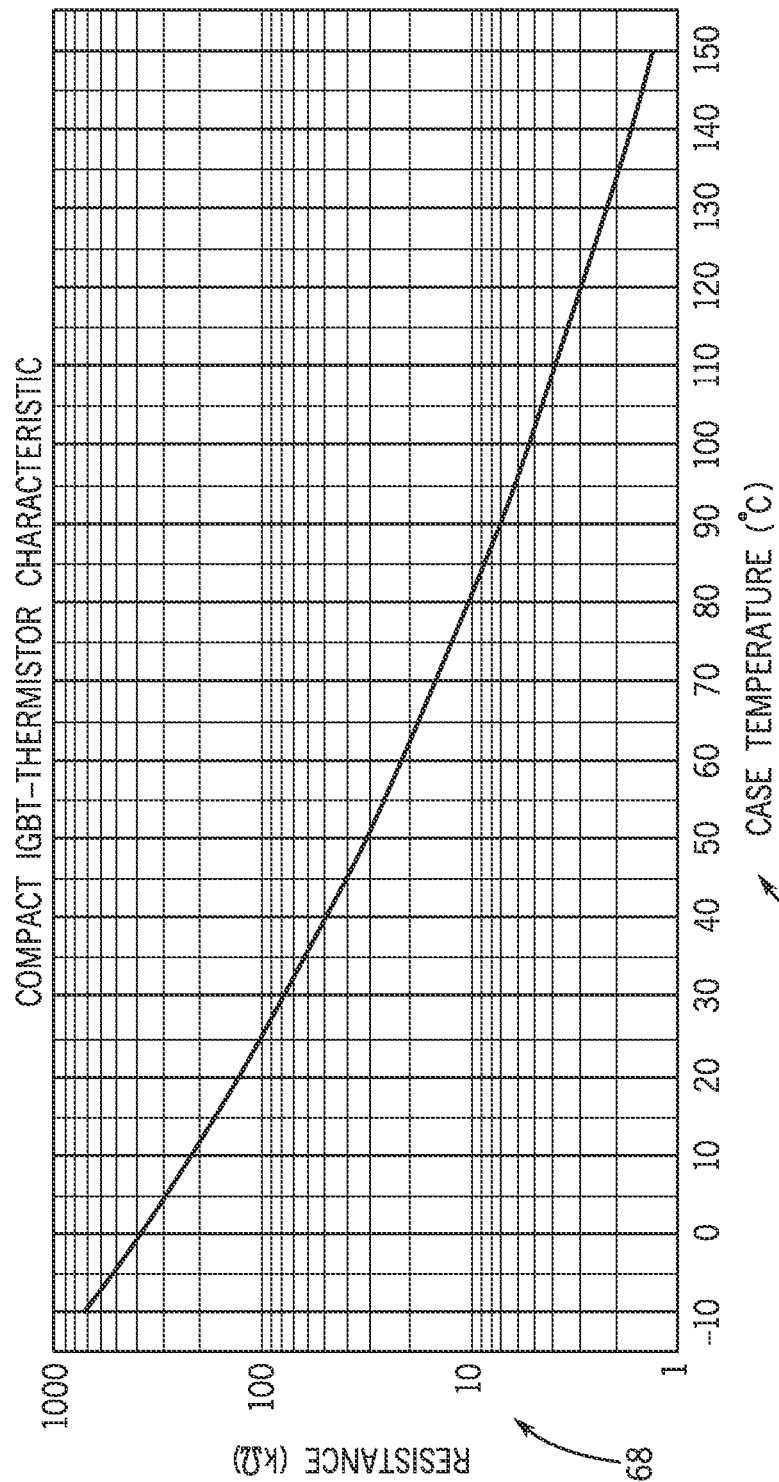
FIG. 5 is a diagram illustrating an IGBT thermistor characteristic.

According to an exemplary embodiment of the invention, in cases where the temperature of a semiconductor device is known, a correction measure can be applied for purposes of selecting a current and voltage relational curve for that semiconductor device. In the case of heavy-duty application, the temperature of the semiconductor device can be assumed to always be at its highest value, such that only one current-voltage curve is required. However, in the case of lower-duty applications, linear interpolation between two curves at IGBT temperature can be employed to determine a current-voltage curve that most accurately describes the current-voltage relationship of a semiconductor device at a particular temperature (e.g., see the two current voltage curves in FIG. 4 at 25° C. and 150° C.). In implementing the above described technique for determining the output current from a power converter, a thermisor that is integrated in the semiconductor device, or positioned external thereto, can be used to measure the temperature of the semiconductor device. As shown in FIG. 5, the temperature of a semiconductor device case 66 is a function of thermistor resistance 68.

Figure 6:
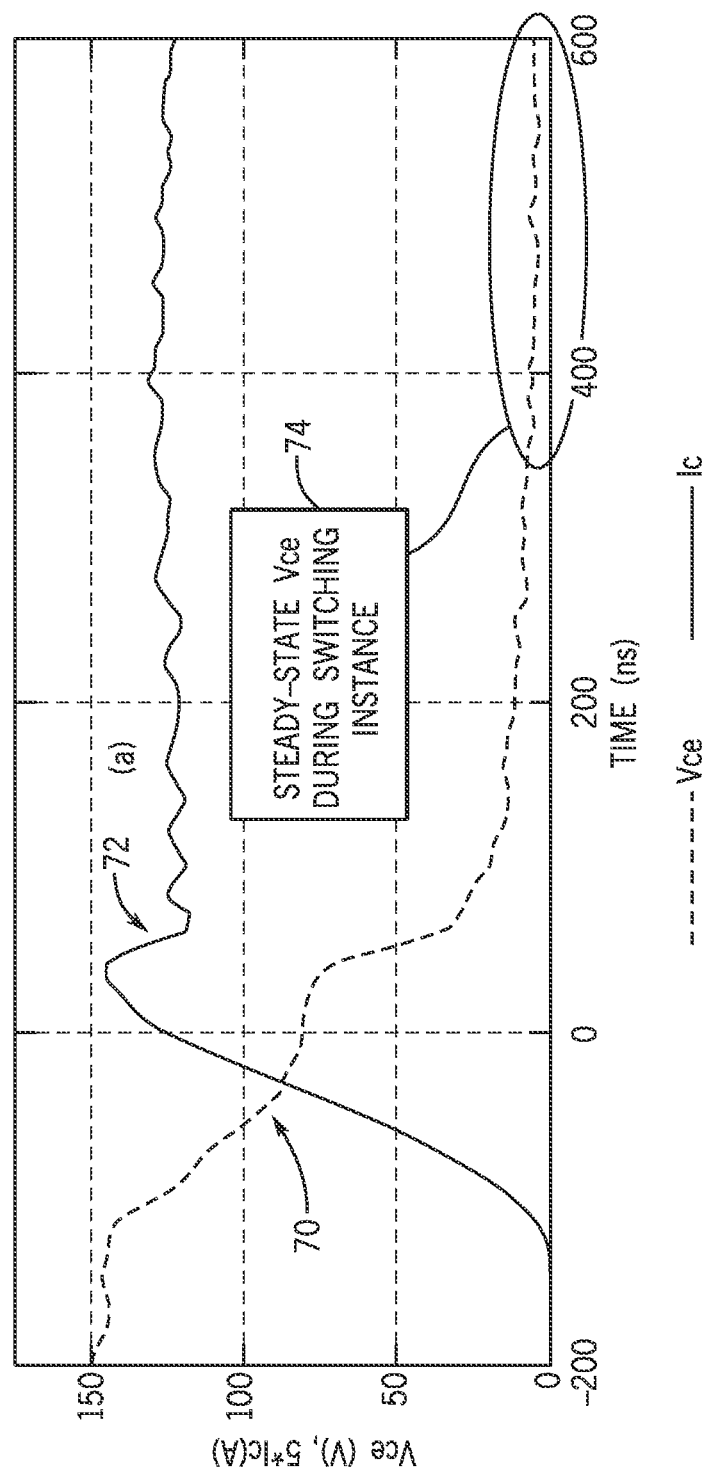
FIG. 6 is a diagram illustrating an IGBT switching transition period.

Additionally, in an exemplary embodiment of the invention, it is desirable that when measuring the voltage across each semiconductor device, that only a steady-state value of the collector-emitter voltage $V_{ce}$ should be used. As can be seen in FIG. 6, which illustrates a switching transition of an IGBT, the magnitude of the collector-emitter voltage $V_{ce}$, indicated as 70, can vary based on the point during the switching transition of the IGBT at which it is measured—thereby also affecting a subsequent determination of the collector current $I_c$, indicated as 72. As such, only the steady-state value of the collector-emitter voltage $V_{ce}$ should be used. The steady-state value of the collector-emitter voltage $V_{ce}$ is indicated at 74 in FIG. 6 and is present during the switch on-state, before the end of the IGBT on-state command and after the desaturation delay.

While the embodiment of the invention set forth above is directed to determining an output current of a power converter, it is recognized that another embodiment of the invention is directed to determining an input current to a power converter, such as power input from a three-phase AC source. That is, in addition to converter/inverter configurations connected to a load, embodiments of the invention apply to converter/inverter configurations connected to the utility grid, with an input current to such a converter/inverter being determined according to the system and technique detailed above.

Figure 7:
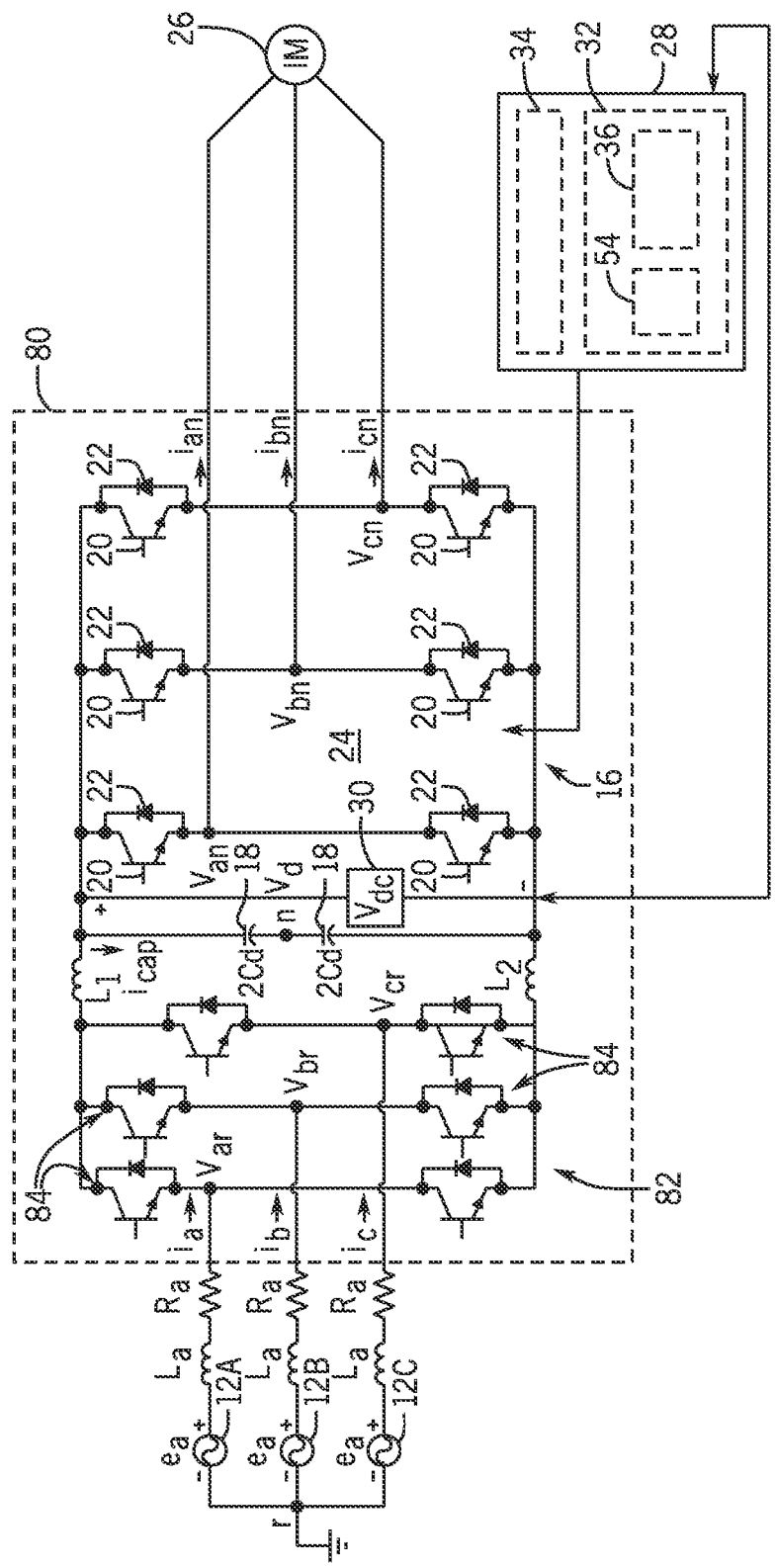
FIG. 7 is a schematic view of a 3-phase AC control system incorporating a power conversion device, such as a variable speed drive (VSD) including an active rectifier and inverter, for controlling voltage to a load in a controlled fashion, according to another embodiment of the invention.

For example, and with reference now to FIG. 7, a VSD 80 is illustrated that is similar to the VSD 10 in FIG. 2, except that the VSD 80 replaces the rectifier 14 of FIG. 2 with an inverter in the form of an active rectifier circuit 82 (also known as an "active front end" or "PWM rectifier"). That is, the diodes of the rectifier 14 in FIG. 2 are replaced with actively controlled switches 84, such as transistors in the form of IGBTs (or MOSFETs), for example. As can be seen in FIG. 7, an arrangement of two IGBT inverter circuits 82, 24 connected side-by-side (and separated by a DC link capacitor bank 18) is thus provided in VSD 80, with inverter 82 being on the "utility side" and inverter 24 being on the "load side." In a VSD 80 having such a topology, each phase of the input current to the inverter 82 (i.e., the input current) can be determined in the same manner as the output current from the inverter 24. That is, a collector-emitter voltage $V_{ce}$ across an IGBT 84 is processed by a processor (e.g., DSP 54) to estimate a current that created this voltage drop, such as by utilizing a look-up table or employing an analytical function. In determining the input current to inverter 82, a voltage across each IGBT 84 (i.e., the collector-emitter voltage $V_{ce}$) is first measured and then, based on the measured voltage, a corresponding current and voltage relational curve is selected for each IGBT 84, with the collector current $I_c$ at each IGBT then being determined based on the voltage-current relationship defined by its respective selected current-voltage curve. When the collector current $I_c$ for each of the IGBTs 84 is determined, such as for each of the six IGBT 84 in the active rectifier 82, then the three-phase input current can be calculated.

In implementing the above described technique for determining the input and/or output current for a power converter, certain considerations are made. For example, when using a standard desaturation circuit, such as desaturation circuit 36, each IGBT current should be sampled at the PWM center point, when $V_{cesat}$ is positive—although it is recognized that a desaturation circuit could be designed to measure the true $V_{cesat}$, regardless of the current direction. Another consideration is that, for each phase, both upper and lower device currents are captured, with the summation being the phase current—although it is recognized that a single current sampling per PWM cycle could be sufficient, such as in an arrangement where switches in the same phase leg have an inverse logic and, if the upper switch is on, the lower one is off, such that—regardless of power factor and as a result current direction—one of two transistors will be able to sample phase current in positive direction (with diode current during reverse recovery and during switch's on-state at negative current being ignored). Additional considerations could also include filtering out the switching frequency components to obtain phase currents (although undersampling may negate the need for filtering) and scaling the currents properly.

Figure 8:
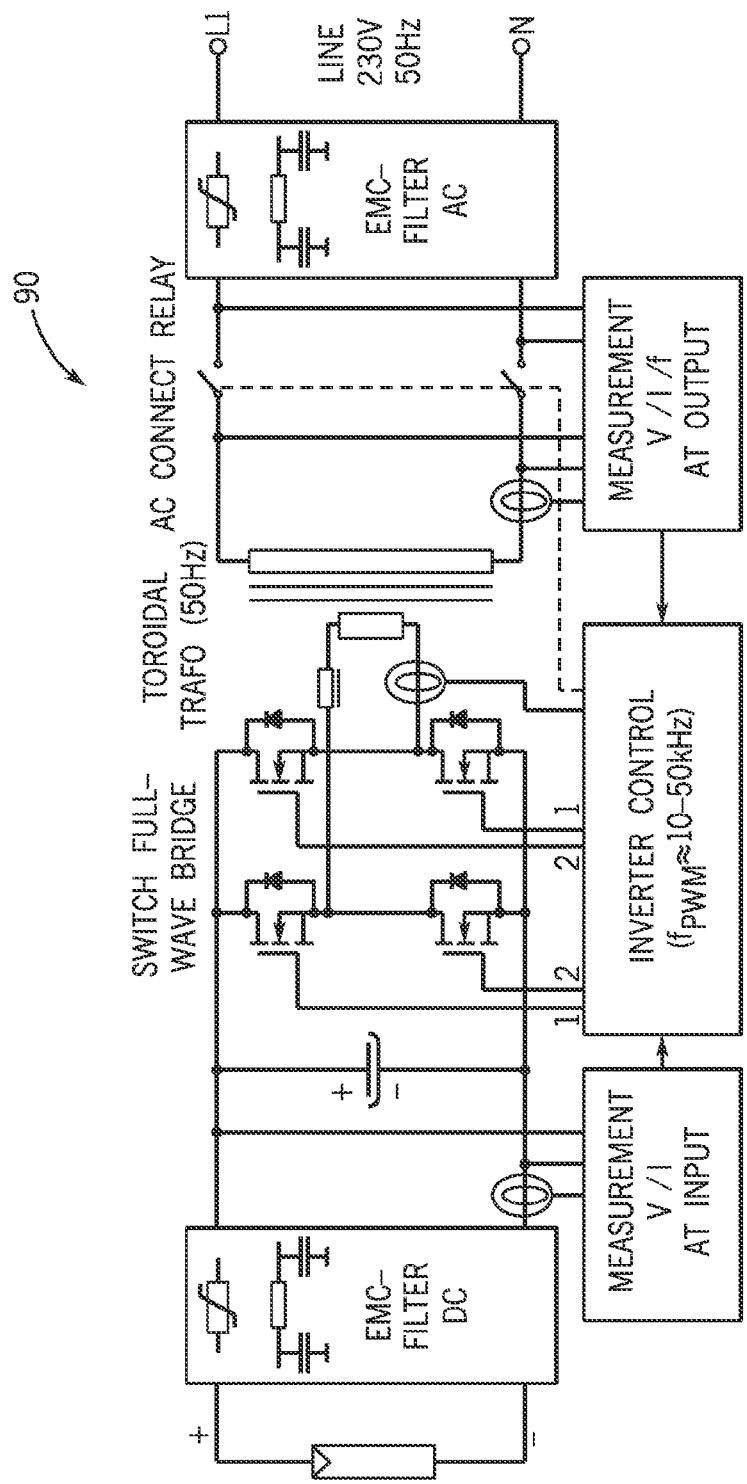
Figure 9:
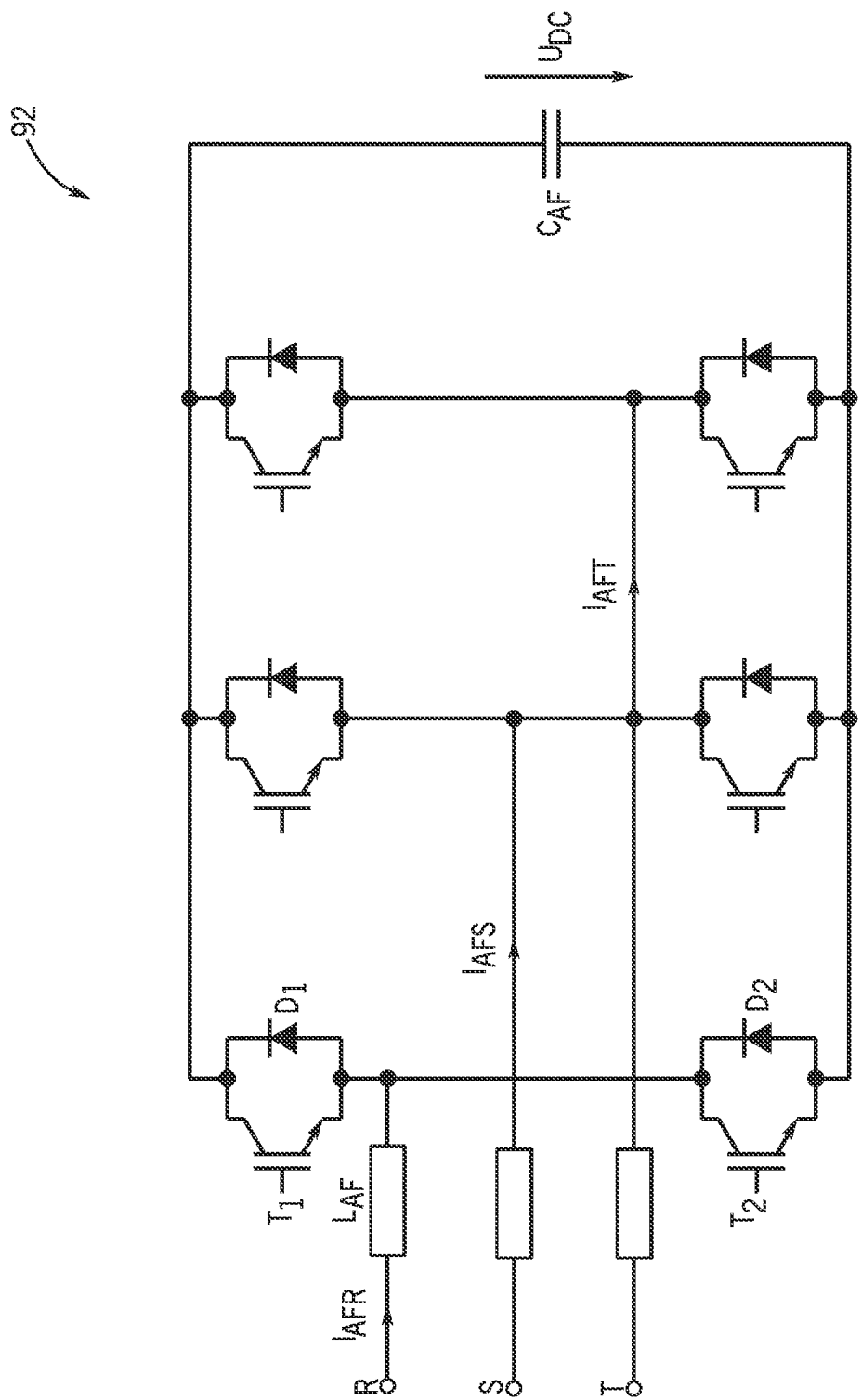
Figure 10:
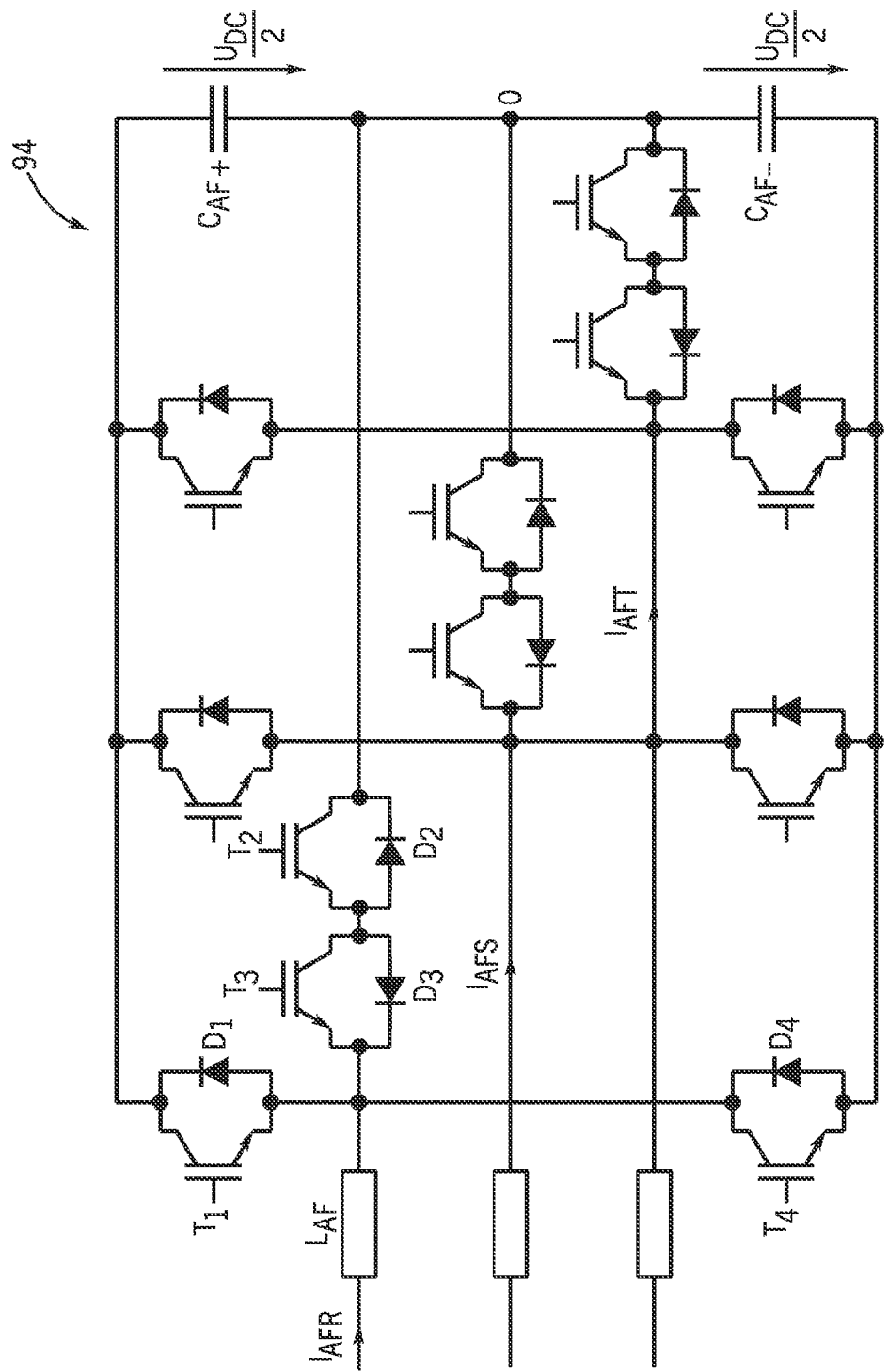
Figure 11:
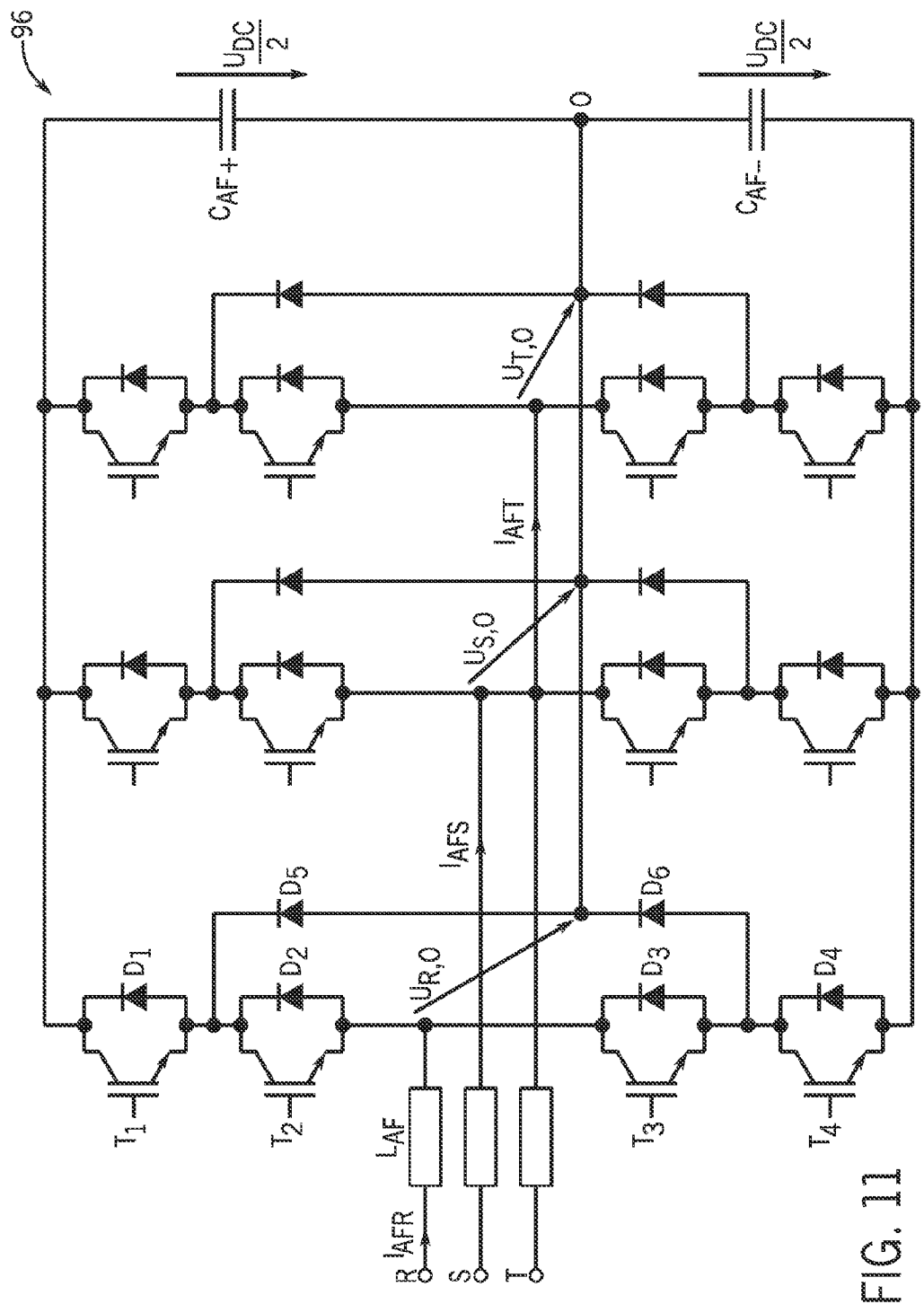

As previously indicated above, it is recognized that embodiments of the present invention may be incorporated into, and utilized with, power converters having various topologies. Thus, beyond the VSD illustrated in FIGS. 2 and 7, FIGS. 8-11 illustrate several additional power converter topologies that may be used in conjunction with embodiments of the present invention. FIG. 8 illustrates a single-phase solar inverter 90. FIG. 9 shows a two-level converter 92. FIG. 10 depicts a three-level T-type converter 94. FIG. 11 illustrates an NPC three-level converter 96. With respect specifically to implementation of the proposed current measurement technique to a NPC (three- or N-level) converter 96 (FIG. 11), it is noted that currents of T2 and T3 can be used/measured, as line current here always flows through one of T2 and T3 at a time. With respect specifically to implementation of the proposed current measurement technique to a T-type converter 94 (FIG. 10), it is noted that currents of T1 and T4 can be used/measured, as one of T1 and T4 conducts the line current at least once per PWM cycle.

Beneficially, embodiments of the invention thus provide a system and method for accurate determination of an input and/or output current of a VSD or other power converter/inverter, without requiring the use of high-cost, environmentally sensitive, space consuming current sensors. An existing desaturation circuit can be utilized in enabling such a determination, with the semiconductor saturation characteristics between its On state voltage and current flowing through the semiconductor device being utilized to determine the current from the power converter. A voltage across each semiconductor device in the power converter is first measured, with a corresponding current and voltage relational curve then being selected for each semiconductor device, with the temperature of the switches being taken into account. The collector current at each semiconductor device can then be determined based on a respective current-voltage curve, with the input/output current then being calculated upon determination of the collector current at each of the semiconductor devices.

A technical contribution for the disclosed method and apparatus is that it provides for a computer implemented technique for determining single-phase and/or three-phase input or output current in electronic power converters. The technique employs the capabilities of a gate driver desaturation protection circuit for purposes of utilizing the relationships between the semiconductor device voltage drop and current in order to determine the power converter input or output current.

Therefore, according to one embodiment of the present invention, a current monitoring system for capturing current information for a power converter includes a circuit having a plurality of semiconductor switches being controllable to convert an input power from a source to an output power having a desired voltage and current. The current monitoring system also includes a control system operably connected to the circuit, with the control system comprising a PWM signal generator configured to generate switching signals to control switching of the plurality of semiconductor switches, a gate driver corresponding to each of the plurality of semiconductor switches that is configured to receive the switching signals from the PWM signal generator and produce an amplified high-current drive signal for input to a respective semiconductor switch so as to facilitate efficient switching thereof, and a desaturation circuit connected to each gate driver to provide overcurrent protection to a respective semiconductor switch, with the desaturation circuit configured to measure a voltage across its respective semiconductor switch. The control system further includes a processor programmed to receive voltage data from the desaturation circuits regarding a measured voltage across each of the plurality of semiconductor switches, determine a current through each of the plurality of semiconductor switches based on the voltage across each respective semiconductor switch, and calculate an input current to the circuit or an output current of the circuit based on the determined currents through the plurality of semiconductor switches.

According to another embodiment of present invention, a method for capturing current information for a power converter includes operably connecting a gate driver desaturation circuit to each of a plurality of semiconductor switches in a power converter, with the power converter configured to convert an input power having one or more phases to an output power having one or more output phases. The method also includes measuring a voltage across each of the plurality of semiconductors by way of the gate driver desaturation circuit, determining a current flowing through of each of the plurality of semiconductor switches based on the voltage across each respective semiconductor switch, and calculating a current input of each of the one or more phases of input power or a current output on each of the one or more output phases of the power converter based on the determined currents flowing through the plurality of semiconductor switches.

According to yet another embodiment of the present invention, a current detection system includes a power converter having a plurality of transistors being controllable to convert an input power from a source to an output power having one or more output phases, with each of the plurality of transistors comprising an emitter terminal, a collector terminal, and a gate terminal. The current detection system also includes a control system operably connected to the power converter, with the control system further comprising a PWM signal generator configured to generate switching signals to control switching of the plurality of transistors, a gate driver corresponding to each of the plurality of transistors and configured to receive the switching signals from the PWM signal generator and produce an amplified high-current drive signal for input to a respective transistor so as to facilitate efficient switching thereof, and a desaturation circuit connected to each gate driver to provide overcurrent protection to a respective transistor, the desaturation circuit configured to measure a voltage across its respective transistor. The control system also includes a processor being programmed to receive voltage data from the desaturation circuits regarding a measured collector-emitter voltage drop across each of the plurality of transistors, select a current-voltage relational curve for each of the plurality of transistors that defines a relationship between a collector-emitter voltage drop across a respective transistor and a corresponding collector current, determine a collector current of each of the plurality of transistors based on a current-voltage relational curve for the respective transistor, and calculate one of a current input to the power converter or a current output from the power converter based on the determined collector currents of the plurality of transistors.

The present invention has been described in terms of the preferred embodiment, and it is recognized that equivalents, alternatives, and modifications, aside from those expressly stated, are possible and within the scope of the appending claims.

What is claimed is:

1. A current monitoring system for capturing current information for a power converter, the current monitoring system comprising:
    a circuit including a plurality of semiconductor switches being controllable to convert an input power from a source to an output power having a desired voltage and current; and
    a control system operably connected to the circuit, the control system comprising:
        a PWM signal generator configured to generate switching signals to control switching of the plurality of semiconductor switches;
        a gate driver corresponding to each of the plurality of semiconductor switches and configured to receive the switching signals from the PWM signal generator and produce an amplified high-current drive signal for input to a respective semiconductor switch so as to facilitate efficient switching thereof;
        a desaturation circuit connected to each gate driver to provide overcurrent protection to a respective semiconductor switch, the desaturation circuit configured to measure a voltage across its respective semiconductor switch; and
        a processor being programmed to:
            receive voltage data from the desaturation circuits regarding a measured voltage across each of the plurality of semiconductor switches;
            determine a current through each of the plurality of semiconductor switches based on the received voltage data;
            add together, for each phase of the input power or output power, the determined current through a pair of semiconductor switches on a respective phase leg of the circuit to generate a summation of the current on the respective phase; and
            calculate an input current to the circuit or an output current of the circuit based on the summation of the current on each phase.

2. The current monitoring system of claim 1 wherein the processor is further programmed to determine the current through a respective semiconductor switch based on a current-voltage relational curve for the respective semiconductor switch, with the current being determined from the voltage across the respective semiconductor switch and the current-voltage relational curve.

3. The current monitoring system of claim 2 wherein the processor is further programmed to select the current-voltage relational curve for a respective semiconductor switch from a plurality of current-voltage relational curves based on a sensed temperature of the respective semiconductor switch.

4. The current monitoring system of claim 1 wherein the processor is further programmed to determine the current through a respective semiconductor switch by accessing a look-up table that correlates voltages across a semiconductor switch with corresponding currents.

5. The current monitoring system of claim 1 wherein the measured voltage across a semiconductor switch comprises a collector-emitter voltage drop, and wherein the current through a semiconductor switch comprises a collector current determined based on the measured voltage drop.

6. The current monitoring system of claim 5 wherein the collector-emitter voltage that is measured comprises a steady-state value of the collector-emitter voltage that is measured in a switch on-state before the end of a semiconductor switch on-state command and after a desaturation delay.

7. The current monitoring system of claim 1 wherein the voltage across the semiconductor switch is measured at a pulse width modulation (PWM) center point, when the voltage is positive.

8. The current monitoring system of claim 1 wherein the plurality of semiconductor switches forms a half-bridge circuit on each phase of the power converter, with each half-bridge circuit comprising an upper switch and a lower switch; and
    wherein the processor is programmed to determine the current input to or output from each phase based on a summation of the current through the upper switch and the current through the lower switch.

9. The current monitoring system of claim 1 wherein the plurality of semiconductor switches forms an active rectifier configured to rectify a three-phase current input, with the processor being programmed to determine the three-phase current input.

10. The current monitoring system of claim 1 wherein the plurality of semiconductor switches forms an inverter configured to generate a three-phase current output, with the processor being programmed to determine the three-phase current output.

11. The current monitoring system of claim 1 wherein the plurality of semiconductor switches forms a single phase solar inverter, with the processor being programmed to determine a single-phase current output.

12. The current monitoring system of claim 1 wherein the plurality of switches comprises insulated gate bipolar transistors (IGBTs) or metal-oxide-semiconductor field-effect transistors (MOSFET).

13. A method for capturing current information for a power converter comprising:
    operably connecting a gate driver desaturation circuit to each of a plurality of semiconductor switches in a power converter, the power converter configured to convert an input power having one or more phases to an output power having one or more output phases;
    measuring a voltage across each of the plurality of semiconductors by way of the gate driver desaturation circuit;

determining a current flowing through each of the plurality of semiconductor switches based on the measured voltage across each respective semiconductor switch; and calculating a current input of each of the one or more phases of input power or a current output on each of the one or more output phases of the power converter based on the determined currents flowing through the plurality of semiconductor switches;

wherein calculating the current input of each of the one or more phases of input power or the current output on each of the one or more output phases of the power converter comprises summing currents flowing through a pair of transistors on each respective phase of the one or more phases of input power or the one or more output phases.

14. The method of claim 13 wherein determining the current comprises determining the current flowing through of each of the plurality of semiconductor switches based on a current-voltage relational curve for a respective semiconductor switch, with the current being determined from the voltage across the respective semiconductor switch and the current-voltage relational curve.

15. The method of claim 14 further comprising selecting the current-voltage relational curve for a respective semiconductor switch from a plurality of current-voltage relational curves based on a sensed temperature of the respective semiconductor switch.

16. The method of claim 13 wherein determining the current comprises determining the current flowing through a respective semiconductor switch by accessing a look-up table that correlates voltages across a semiconductor switch with corresponding currents.

17. The method of claim 13 wherein the measured voltage across a semiconductor switch comprises a collector-emitter voltage drop, and wherein the current flowing through a semiconductor switch comprises a collector current determined based on the measured voltage drop.

18. A current detection system comprising:
a power converter including a plurality of transistors being controllable to convert an input power from a source to an output power having one or more output phases, each of the plurality of transistors comprising an emitter terminal, a collector terminal, and a gate terminal; and
a control system operably connected to the power converter, the control system comprising:
a PWM signal generator configured to generate switching signals to control switching of the plurality of transistors;
a gate driver corresponding to each of the plurality of transistors and configured to receive the switching signals from the PWM signal generator and produce an amplified high-current drive signal for input to a respective transistor so as to facilitate efficient switching thereof;
a desaturation circuit connected to each gate driver to provide overcurrent protection to a respective transistor, the desaturation circuit configured to measure a voltage across its respective transistor; and
a processor being programmed to:
receive voltage data from the desaturation circuits regarding a measured collector-emitter voltage drop across each of the plurality of transistors;
select a current-voltage relational curve for each of the plurality of transistors that defines a relationship between a collector-emitter voltage drop across a respective transistor and a corresponding collector current;
determine a collector current of each of the plurality of transistors based on a current-voltage relational curve for the respective transistor; and
calculate one of a current input to the power converter or a current output from the power converter based on the determined collector currents of the plurality of transistors;
wherein, in calculating the one of the current input to the power converter or the current output from the power converter, the processor is further programmed to determine the current on each of one or more phases of input power or on each of the one or more output phases of the power converter based on a summation of collector currents from a pair of transistors of the plurality of transistors on each respective phase.

19. The current detection system of claim 18 wherein the processor is further programmed to select the current-voltage relational curve for a respective semiconductor switch from a plurality of current-voltage relational curves based on a sensed temperature of the respective semiconductor switch.

20. The current detection system of claim 18 wherein the processor is programmed to determine the current output on each of the one or more output phases of the power converter based on the summation of collector currents from the pair of transistors on each respective phase.

21. The current detection system of claim 18 wherein the processor is programmed to determine the current input to the power converter for each of the one or more phases of the input power based on the summation of collector currents from the pair of transistors on each respective phase.

* * * * *